United States Patent [19]
Hazen

[11] Patent Number: 5,368,325
[45] Date of Patent: Nov. 29, 1994

[54] UNIVERSAL SINGLE-WHEEL SINGLE BEAM TRAILER HAVING ADJUSTABLE BED

[76] Inventor: Donald B. Hazen, P.O. Box 880, Highlands City, Fla. 33846

[21] Appl. No.: 61,234

[22] Filed: May 17, 1993

[51] Int. Cl.⁵ .............................................. B62D 23/00
[52] U.S. Cl. .................. 280/656; 280/47.15; 280/78
[58] Field of Search ............. 280/656, 638, 47.15, 280/651, 47.13, 79.4, 400, 79.11, 78; 298/3, 4

[56] References Cited

U.S. PATENT DOCUMENTS

| | | | |
|---|---|---|---|
| 1,794,630 | 3/1931 | Linn | 280/78 |
| 1,901,183 | 3/1933 | McKahin | 280/47.15 |
| 2,453,916 | 11/1948 | Inskeep | 280/78 |
| 2,563,372 | 8/1951 | Risse | 280/656 |
| 2,596,655 | 5/1952 | Converse | 280/78 |
| 3,877,714 | 4/1975 | Black | 280/78 |
| 3,917,316 | 11/1975 | Furnish | 280/78 |
| 4,426,097 | 1/1984 | Livingston | 280/78 |
| 4,645,230 | 2/1987 | Hammons | 280/656 |
| 4,699,393 | 10/1987 | Schweigert | 280/656 |

Primary Examiner—Richard M. Camby
Attorney, Agent, or Firm—Macdonald J. Wiggins

[57] ABSTRACT

A trailer for towing by an automotive type vehicle includes a single longitudinal beam. A plurality of adjustable transverse cradle support members are mounted along the beam. A single castered wheel is mounted near the back end of the beam. A hitch for attachment to a towing vehicle at the front end of the beam maintains the beam aligned with a longitudinal axis of the towing vehicle. Various types of loads may be accommodated by attaching appropriate type cradles to the cradle support members, and the spacing of support members may be adjusted to accept the load.

7 Claims, 1 Drawing Sheet

U.S. Patent  Nov. 29, 1994  5,368,325
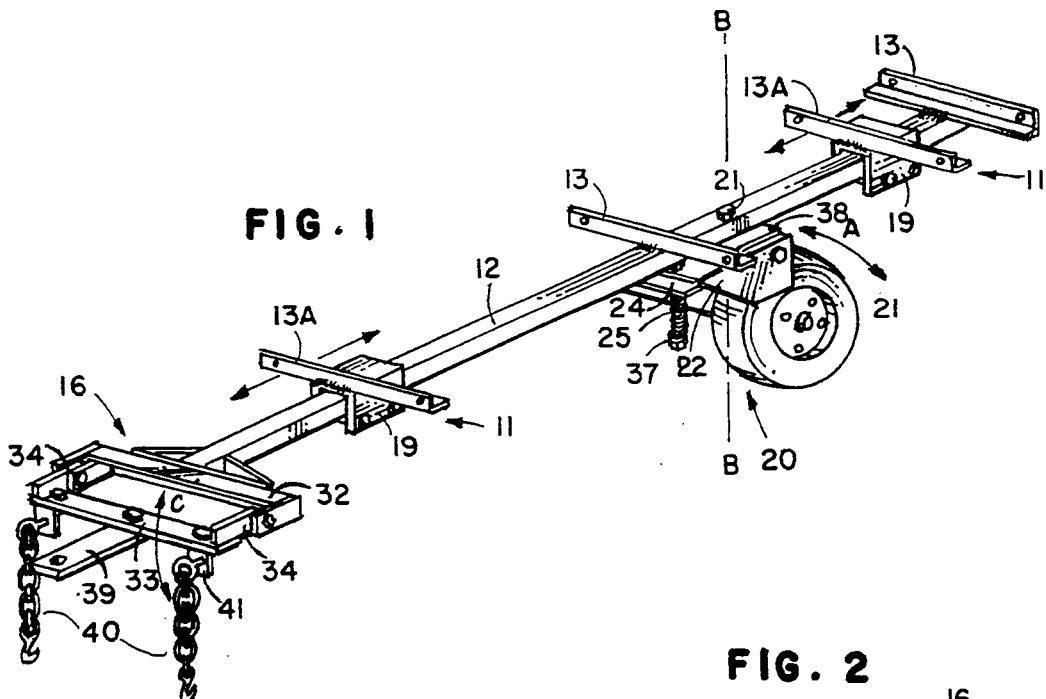
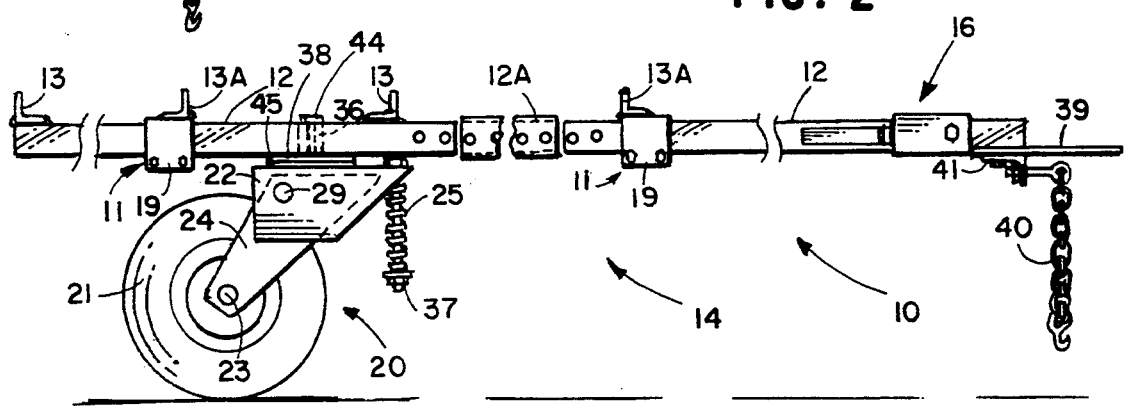
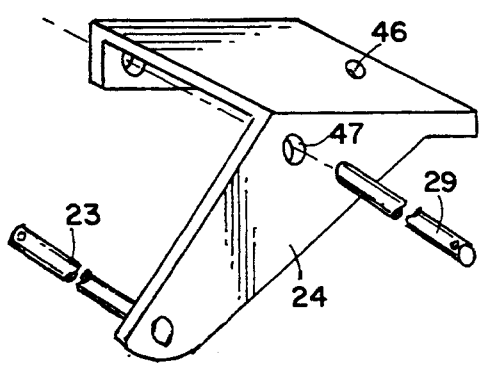
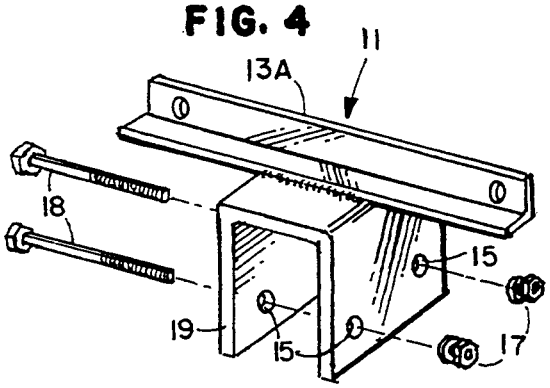

UNIVERSAL SINGLE-WHEEL SINGLE BEAM TRAILER HAVING ADJUSTABLE BED

GROUND OF THE INVENTION

1. Field of the Invention

The present invention relates to a trailer for towing behind an automotive vehicle, and more particularly to a trailer having single, castered wheel, a single beam, and multiple adjustable load support members.

2. Description of the Prior Art

For transporting small loads, trailers are known that may be towed behind automotive type vehicles. Most such trailers are designed for a specific application; for example, boat trailers, camping trailers, trailers with pods, and flat bed trailers. It is also known to utilize single-wheel type trailers for relatively light loads to reduce the cost of the device. To permit a single wheel trailer to be easily backed, it is common to use a double hitch on the towing vehicle. The prior art single-wheel trailers generally use a castered wheel in which the wheel axle is displaced rearward of the kingpin, permitting the wheel to follow turns. Known single-wheel trailers are designed to carry a particular type of load. Thus, there is a need for single-wheel trailer having a single beam adapted to accept a variety of loads, such as flat or box beds, pods, boat cradles, and other devices within the load limit.

Typical single wheel trailers are described in U.S. Pat. Nos. 2,009,548 and 4,6465,230. The '230 patent has a fixed rectangular bed, and removable walls and top. The '548 patent has a single wheel fixedly mounted to a longitudinal frame, and a sheet metal streamlined pod. The wheel cannot caster, and will tend to skid laterally during a turn. Two wheel trailers having a longitudinal beam and having adjustable transverse members for mounting various type beds are known. For example, U.S. Pat. No. 2,766,053 uses a tubular beam with adjustable boat trailer cradles. A hay bail trailer is disclosed in U.S. Pat. No. RE29,455 having a pair of vertical posts, adjustable along a longitudinal beam to a limited degree. None of these references discloses a single castered wheel. U.S. Pat. No. 3,332,705 teaches a double ended handling truck having a draw bar at each end. Dual wheels are disposed at each end, each pair having a vertical kingpin. Transverse beams are attached to the central beam, each having a castered wheel at its outer ends.

None of these references teach a single-wheel trailer, castered to follow a towing vehicle in which a longitudinal beam is fixedly attached to a towing vehicle, and which can be easily and quickly adjusted for a desired load type.

SUMMARY OF THE INVENTION

The present invention is a single-wheel trailer having a single longitudinal beam, and a plurality of adjustable and interchangeable transverse cradle members. A single castered wheel assembly is attached near the rear end of the beam. The term "castered wheel", as used herein refers to a wheel mounted by a transverse axle in the wheel assembly and having a vertical kingpin pivotally attached to the wheel assembly, in which the wheel axle lies in a vertical plane that rotates about the kingpin axis as the assembly rotates.

In the invention, the wheel is mounted to an arm by means of a transverse pivot. The arm depends from a frame by a second transverse pivot with a shock-absorbing spring disposed therebetween. As will be recognized, the arm is attached to the frame ahead of the wheel axis when the wheel is in a trailing position to permit castering of the wheel during turns.

A plurality of cradle support members is attached to a clamp members for clamping along the beam. The support member may be a short section of angle iron having holes for attachment of cradle members. As will be recognized, the cradle support members may be mounted to the beam at any point therealong. The spacing of the support members may be changed to accept pods, boat cradles, flat beds, and the like. Fixed cradle support members may also be provided.

A hitch is attached to the forward end of the beam. The hitch includes transverse bars to maintain the beam aligned with the longitudinal axis of the vehicle, and horizontal pivots to allow the trailer to follow the vehicle over uneven surfaces.

It is therefor a principal object of the invention to provide a trailer that is adjustable to accommodate a variety of sizes and types of loads, and that is suitable for towing by an automotive vehicle.

It is another object of the invention to provide a trailer using a single castered wheel, and a single longitudinal beam having a hitch for positive connection to a towing vehicle.

It is still another object of the invention to provide a plurality of transverse support members for attached to the beam, including adjustable members for accepting various types of loads.

These and other objects and advantages of the invention will become apparent from the following detailed description when read in conjunction with the drawings.

BRIEF DESCRIPTION OF THE DRAWINGS

FIG. 1 is a perspective view of the trailer of the invention;

FIG. 2 is an elevation view of the trailer of FIG. 1; and

FIG. 3 is an exploded view of the wheel assembly for supporting the single wheel of the trailer showing the king pin;

FIG. 4 is a perspective view of a typical adjustable support member.

DETAILED DESCRIPTION OF THE PREFERRED EMBODIMENT

Referring to FIG. 1 a perspective view of one implementation of the trailer 10 is presented. The major elements of the trailer are preferably formed of suitable steel, although other materials may be substituted for special applications. A longitudinal beam 12 is provided that is preferably rectangular, although other cross sectional shapes may be used. The length of beam 12 is selected in accordance with the maximum length loads to be carried. At the forward end thereof, beam 12 has a trailer hitch 16 attached thereto. A single castered wheel assembly 20 is pivotally attached to beam 12 toward the rear end of the beam. A pair of permanently mounted transverse support members 13 is shown that may be formed from right angle stock, and include mounting holes for attachment of cradles, pods, and the like.

In FIG. 2, an alternative arrangement of beam 12 is shown that permits adjustments of the length of the beam. A set of tubular beam extenders 12A may be provided to increase the length of beam 12 for various types of loads to be carried. Beam 12 is shown separated into a front portion and a rear portion. Inner ends of the split beam are inserted into an extender 12A, and secured by bolts (not shown) in the bolt holes 12C.

A pair of adjustable transverse support members 11 is shown in FIG. 1 and in FIG. 2, and in more detail in FIG. 4 as discussed hereinafter.

Details of wheel assembly 20 may be seen from FIG. 2 and FIG. 3. Wheel 21 is supported by an L-shaped arm 24 shown in more detail in FIG. 3. Arm 24 is attached to frame 22 by a horizontal pivot 29 forward of the axle 23 of wheel 21 when wheel 21 is in a trailing mode. A vertical coil spring 25 and an essentially vertical retainer rod 37 is attached to a horizontal portion of frame 22 and extends through the hole 46 in the horizontal portion of L-shaped arm 24 and a matching hole in frame 22. Coil spring 25 is disposed between arm 24 and the lower end of rod 37. This arrangement provides a shock absorber for wheel assembly 20 as arm 24 pivots about pivot 29.

A kingpin 44, shown in FIG. 2 by dashed lines and in the exploded view of FIG. 3, is welded to a steel plate 44A. Kingpin 44 is inserted through opening 36 and welded to beam 12. Also, plate 44A is welded to a bottom surface of beam 12. A bearing plate 38, and nylon plate 45 are disposed over kingpin 44. The lower end of kingpin 44 passes through a hole 36A in the top surface of frame 22 and is secured by a washer and castellated nut (not shown) on the underside of the top surface of frame 22. Nylon washer 45 serves to dampen the caster action, and to prevent shimmy of the wheel assembly 20. As will be noted, wheel assembly 20 trails kingpin 44 during forward travel of the trailer 10. Thus, the weight of a load on beam 12 serves to maintain wheel assembly 20 in a trailing relationship relative to the direction of movement of beam 12. For example, when a towing vehicle is backing, wheel assembly 20 will caster about kingpin 44 as shown by arrow A around axis B, to follow the rearward movement of the vehicle and trailer 10.

FIG. 4 shows details of a typical adjustable cradle support member 11. A section of channel stock 19 has a transverse angle iron bracket 13A welded to a top surface thereof. Holes 15 in the skirt portions accept bolts 18 after placing the member 11 at a desired point along beam 12. Adjustments of the spacing of the members 11 are thus easily made. Nuts and lockwashers 17 are installed and tightened to secure members 11 at the desired location. Holes in members 13 and 13A are provided for attaching loads thereto. As shown in FIGS. 1 and 2, members 11 may be placed at desired points along beam 12 in accordance with the load to be attached.

FIG. 1 illustrates a preferred hitch assembly permitting trailer 10 to be attached to the towing vehicle. A transverse frame 32 is attached to the forward end of beam 12. A second transverse frame 33 is attached by pivots 34 to frame 32. Thus, frame 33 is permitted to swing vertically as indicated by arrow C. A forwardly extending hitch bar 39 is bolted to the center of frame 33 having a bolt hole in its distal end. The hitch bar is bolted to a standard trailer hitch assembly on the towing vehicle. An L-bracket 41 is bolted to each end of the horizontal bar portion of frame 33. An eye bolt is installed in each L-bracket 41 with a chain and hook 40 attached thereto. Each chain 40 is wrapped around a suitable structural member of the towing vehicle to maintain hitch frame 16 parallel with the rear vehicle frame member during towing. It may be noted that pivots 34 accommodate differences in height of wheelbase between the trailer and vehicle, and ground surface differences.

A single beam trailer having a castered single wheel has been disclosed having fixed and adjustable support members for accepting cradle members for various types of loads. Although a specific design has been shown for illustrative purposes, changes may be made without departing from the spirit and scope of the invention.

I claim:

1. A single-wheel trailer for towing by automotive type vehicles comprising:
   an elongate longitudinal beam;
   a vertical kingpin attached to said longitudinal beam;
   a wheel support assembly attached to a lower end of said kingpin;
   a wheel having a horizontal axle, said axle supported in said wheel support assembly and displaced from said kingpin to permit said wheel assembly to caster during towing of said trailer;
   a plurality of movable transverse support members disposed along said beam for accepting various types of load supports; and
   hitch means for coupling said trailer to a towing vehicle.

2. The trailer as defined in claim 1 in which said wheel support assembly includes:
   a) a U-shaped frame having a horizontal top surface and a pair of side surfaces depending therefrom, a lower end of said kingpin rotatably attached to said top surface; and
   b) an essentially L-shaped arm having a top surface parallel and adjacent to said top surface of said U-shaped frame, a first short side surface, and a second long side surface depending from said top surface and having a horizontal pivot attached to said U-shaped frame side surfaces, said wheel axle attached to a distal end of said first long side surface of said L-shaped arm.

3. The trailer as defined in claim 1 in which said beam includes at least one transverse support member permanently attached thereto.

4. The trailer as defined in claim 1 in which said trailer hitch assembly includes:
   a) a first transverse hitch member attached to a forward end of said beam;
   b) a second transverse hitch member horizontally pivoted to said first transverse hitch member;
   c) means for connecting said transverse hitch member to a towing vehicle; and
   d) a chain connected at each end of said second transverse member for attachment to a frame member of a towing vehicle.

5. The trailer as defined in claim 1 in which said beam includes means for adjusting the length of said beam.

6. The trailer as defined in claim 5 in which said means for length adjustment includes:
   a) a cut through said beam to form two sections thereof;
   b) at least one section of tubing having an inner profile to slip over ends of said beam sections; and
   c) means for attaching said tubing to said beam sections.

7. An adjustable bed, single castered wheel trailer for towing by an automotive type vehicle comprising:

a) an elongate horizontal beam having a forward end for attachment to a vehicle in which said beam includes means for adjusting the length of said beam;

b) a single wheel mounted in a frame pivotally attached to a vertical kingpin, said kingpin attached to said beam adjacent a rear end thereof, said wheel having a horizontal axle disposed in said frame displaced from said kingpin whereby said wheel assembly casters relatively to said beam; and c) a trailer hitch assembly having rigidity in a vertical plane and laterally pivoted, said assembly attached to said forward end of said beam for attachment to the vehicle and for maintaining said trailer aligned with a longitudinal axis of a towing vehicle.

* * * * *